(12) United States Patent
Lu et al.

(10) Patent No.: US 12,043,402 B1
(45) Date of Patent: Jul. 23, 2024

(54) SYSTEM AND METHOD FOR PERFORMING AN ACTUATOR RANGE CHECK FOR AN INTERCOOLER FLOW CONTROL ASSEMBLY OF AN AIRCRAFT PROPULSION SYSTEM

(71) Applicant: Pratt & Whitney Canada Corp., Longueuil (CA)

(72) Inventors: Xuening Lu, Oakville (CA); Ezzat Meshkinfam, Mississauga (CA); Thomas Trevor Ricci, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/373,065

(22) Filed: Sep. 26, 2023

(51) Int. Cl.
*B64D 33/08* (2006.01)
*F02C 7/14* (2006.01)
*F02C 9/20* (2006.01)

(52) U.S. Cl.
CPC .............. *B64D 33/08* (2013.01); *F02C 7/14* (2013.01); *F02C 9/20* (2013.01)

(58) Field of Classification Search
CPC .............. B64D 33/08; F02C 7/14; F02C 9/20
See application file for complete search history.

(56) References Cited

U.S. PATENT DOCUMENTS

| | | | |
|---|---|---|---|
| 7,328,852 B2 | 2/2008 | Paolillo | |
| 9,587,561 B2 | 3/2017 | Snyder | |
| 9,689,790 B2 | 6/2017 | Patankar | |
| 11,209,227 B2 * | 12/2021 | Djelassi | F02C 6/08 |

FOREIGN PATENT DOCUMENTS

| | | |
|---|---|---|
| EP | 3741678 A1 | 11/2020 |
| GB | 2513171 B | 7/2018 |
| WO | 2022123168 A1 | 6/2022 |

* cited by examiner

*Primary Examiner* — Brandon D Lee
(74) *Attorney, Agent, or Firm* — Getz Balich LLC

(57) ABSTRACT

An assembly for an aircraft propulsion system includes an intercooler assembly and a controller. The intercooler assembly includes an intercooler and a flow control assembly. The intercooler includes a primary air inlet, a primary air outlet, a secondary air inlet, and a secondary air outlet. The flow control assembly is disposed at the secondary air outlet. The flow control assembly includes an actuator and at least one flap. The actuator is configured to position the at least one flap in an open position, a closed position, and intermediate positions. The controller is configured to control the actuator to position the at least one flap in the open position, determine a hot-side heat transfer effectiveness of the intercooler and a hot-side mass flow rate for the intercooler, determine a cold-side mass flow rate of the intercooler, identify a position of the actuator, and identify a successful or an unsuccessful actuator range check for the actuator.

20 Claims, 5 Drawing Sheets

SYSTEM AND METHOD FOR PERFORMING AN ACTUATOR RANGE CHECK FOR AN INTERCOOLER FLOW CONTROL ASSEMBLY OF AN AIRCRAFT PROPULSION SYSTEM

TECHNICAL FIELD

This disclosure relates generally to an engine assembly intercooler for an aircraft propulsion system and, more particularly, to a system and method for performing an actuator range check for an intercooler flow control assembly.

BACKGROUND OF THE ART

A propulsion system for an aircraft may be configured, for example, with an engine assembly including an engine configured to receive compressed air from a compressor. The engine assembly may include an intercooler configured to cool the compressed air that is supplied from the compressor to an air intake of the engine. The temperature of the compressed air supplied to the engine may be controlled, at least in part, by one or more actuators configured to control the flow of a cooling medium (e.g., ambient air) through the intercooler. Various systems and methods are known in the art for verifying and controlling intercooler operation to regulate engine intake air temperature. While these known engine assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes an intercooler assembly and a controller. The intercooler assembly includes an intercooler and a flow control assembly. The intercooler includes a primary air inlet and a primary air outlet for a hot side of the intercooler. The intercooler includes a secondary air inlet and a secondary air outlet for a cold side of the intercooler. The flow control assembly is disposed at the secondary air outlet. The flow control assembly includes an actuator and at least one flap. The actuator is operably connected to the at least one flap to position the at least one flap in an open position, a closed position, and intermediate positions between the open position and the closed position to control an ambient air flow through the cold side. The controller includes a processor in communication with a non-transitory memory storing instructions, which instructions when executed by the processor, cause the processor to control the actuator to position the at least one flap in the open position, determine a hot-side heat transfer effectiveness of the intercooler and a hot-side mass flow rate for the intercooler with the at least one flap in the open position, determine a cold-side mass flow rate of the intercooler using the hot-side heat transfer effectiveness and the hot-side mass flow rate, identify a position of the actuator using the cold-side mass flow rate, and identify a successful or an unsuccessful actuator range check for the actuator by comparing the identified position of the actuator to an actuator position threshold range. The successful actuator range check is identified where the identified position of the actuator is within the actuator position threshold range.

In any of the aspects or embodiments described above and herein, the assembly may further include a compressor including a compressor air outlet. The compressor air outlet may be connected in fluid communication with the primary air inlet. A bladed compressor rotor for the compressor may be configured to rotate to direct compressed air to the primary air inlet.

In any of the aspects or embodiments described above and herein, the instructions, when executed by the processor, may further cause the processor to control a rotation speed of the bladed compressor rotor by controlling the bladed compressor rotor to rotate at a predetermined rotation speed to determine the hot-side heat transfer effectiveness of the intercooler and the hot-side mass flow rate for the intercooler with the at least one flap in the open position.

In any of the aspects or embodiments described above and herein, the assembly may further include an engine including an engine air inlet connected in fluid communication with the primary air outlet.

In any of the aspects or embodiments described above and herein, the assembly may further include a rotational assembly including a bladed turbine rotor for a turbine, a shaft, and the bladed compressor rotor. The shaft may interconnect the bladed turbine rotor and the bladed compressor rotor.

In any of the aspects or embodiments described above and herein, the engine may further include an engine air outlet connected in fluid communication with the turbine. The engine may be configured to direct a combustion exhaust gas from the engine air outlet to the turbine to drive rotation of the bladed turbine rotor.

According to another aspect of the present disclosure, an assembly for an aircraft propulsion system includes an engine, a compressor, an intercooler assembly, and a controller. The engine includes an engine air inlet. The compressor includes a compressor air outlet and a bladed compressor rotor. The bladed compressor rotor is configured to rotate to direct compressed air to the engine air inlet. The intercooler assembly includes an intercooler and a flow control assembly. The intercooler includes a primary air inlet and a primary air outlet for a hot side of the intercooler. The intercooler includes a secondary air inlet and a secondary air outlet for a cold side of the intercooler. The primary air outlet is connected in fluid communication with the engine air inlet and the primary air inlet is connected in fluid communication with the compressor air outlet such that the compressed air is directed from the compressor air outlet to the engine air inlet through the hot side of the intercooler. The flow control assembly is disposed at the secondary air outlet. The flow control assembly includes an actuator and at least one flap. The actuator is operably connected to the at least one flap to position the at least one flap in an open position, a closed position, and intermediate positions between the open position and the closed position to control an air flow through the cold side. The controller includes a processor in communication with a non-transitory memory storing instructions, which instructions when executed by the processor, cause the processor to control the actuator to position the at least one flap in the open position, determine a hot-side heat transfer effectiveness of the intercooler and a hot-side mass flow rate for the intercooler with the at least one flap in the open position, determine a cold-side mass flow rate of the intercooler using the hot-side heat transfer effectiveness and the hot-side mass flow rate, identify a position of the actuator using the cold-side mass flow rate, and identify a successful or an unsuccessful actuator range check for the actuator by comparing the identified position of the actuator to an actuator position threshold range. The successful actuator range check is identified where the identified position of the actuator is within the actuator position threshold range.

In any of the aspects or embodiments described above and herein, the assembly may further include a gearbox and an electric motor. The engine and the electric motor may be operably connected together by the gearbox.

In any of the aspects or embodiments described above and herein, the instructions, when executed by the controller, may further cause the controller to control the electric motor to drive the engine through the gearbox while determining the hot-side heat transfer effectiveness of the intercooler and the hot-side mass flow rate for the intercooler with the at least one flap in the open position.

In any of the aspects or embodiments described above and herein, the instructions, when executed by the processor, may further cause the processor to execute an engine air inlet temperature control loop in response to identifying the successful actuator range check for the actuator.

In any of the aspects or embodiments described above and herein, the instructions, when executed by the processor, may further cause the process to determine a reduced air temperature limit for the engine air inlet based on identifying the unsuccessful actuator range check for the actuator.

In any of the aspects or embodiments described above and herein, the assembly may further include a plurality of sensors. The plurality of sensors may include a primary air outlet temperature sensor, a primary air outlet pressure sensor, and an ambient temperature sensor.

In any of the aspects or embodiments described above and herein, the instructions, when executed by the processor, may further cause the processor to determine the hot-side heat transfer effectiveness of the intercooler and the hot-side mass flow rate of the intercooler using one or more of the primary air outlet temperature sensor, the primary air outlet pressure sensor, or the ambient temperature sensor.

According to another aspect of the present disclosure, a method for performing an actuator range check for an actuator of a flow control assembly for an intercooler is provided. The method includes controlling the actuator to position at least one flap of the flow control assembly in an open position, determining a hot-side heat transfer effectiveness of the intercooler and a hot-side mass flow rate for the intercooler with the at least one flap in the open position, determining a cold-side mass flow rate of the intercooler using the hot-side heat transfer effectiveness and the hot-side mass flow rate, identifying a position of the actuator using the cold-side mass flow rate, and identifying a successful or an unsuccessful actuator range check for the actuator by comparing the identified position of the actuator to an actuator position threshold range. The successful actuator range check is identified where the identified position of the actuator is within the actuator position threshold range.

In any of the aspects or embodiments described above and herein, with the at least one flap in the open position, the actuator may be in a fully-extended position.

In any of the aspects or embodiments described above and herein, the method may further include directing compressed air through a hot side of the intercooler with a compressor.

In any of the aspects or embodiments described above and herein, the compressor may include a bladed compressor rotor. The method may further include rotating the bladed compressor rotor at a predetermined rotation speed while determining the hot-side heat transfer effectiveness of the intercooler and the hot-side mass flow rate for the intercooler.

In any of the aspects or embodiments described above and herein, the method may further include directing the compressed air from the compressor, through the intercooler, and to an engine air inlet of an engine and cooling the compressed air with the intercooler.

In any of the aspects or embodiments described above and herein, the method may further include executing an engine air inlet temperature control loop, with a controller, in response to identifying the successful actuator range check for the actuator.

In any of the aspects or embodiments described above and herein, the method may further include determining a reduced air temperature limit for the engine air inlet based on identifying the unsuccessful actuator range check for the actuator.

The present disclosure, and all its aspects, embodiments and advantages associated therewith will become more readily apparent in view of the detailed description provided below, including the accompanying drawings.

DETAILED DESCRIPTION

Figure 1:
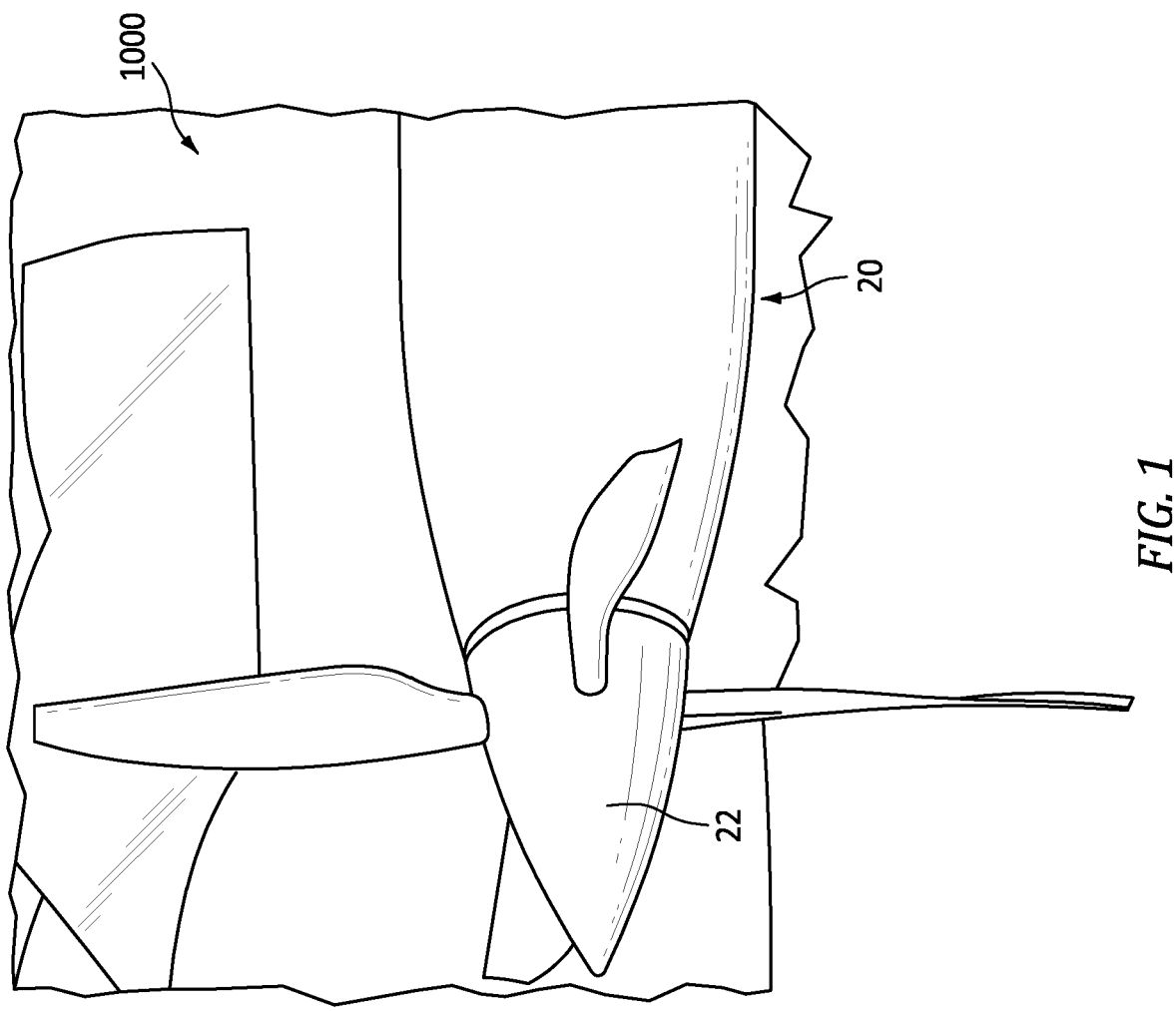
FIG. 1 illustrates a perspective view of aircraft including propulsion system, in accordance with one or more embodiments of the present disclosure.

FIG. 1 illustrates a perspective view of an aircraft 1000. Briefly, the aircraft 1000 may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The aircraft 1000 includes a propulsion system 20 and a propulsor 22. The propulsion system 20 is configured to drive rotation of the propulsor 22 to provide propulsion (e.g., generate thrust) for the aircraft 1000. The propulsor 22 of FIG. 1 is configured as a propeller, however, the present disclosure is not limited to any particular configuration of the propulsor 22.

Figure 2:
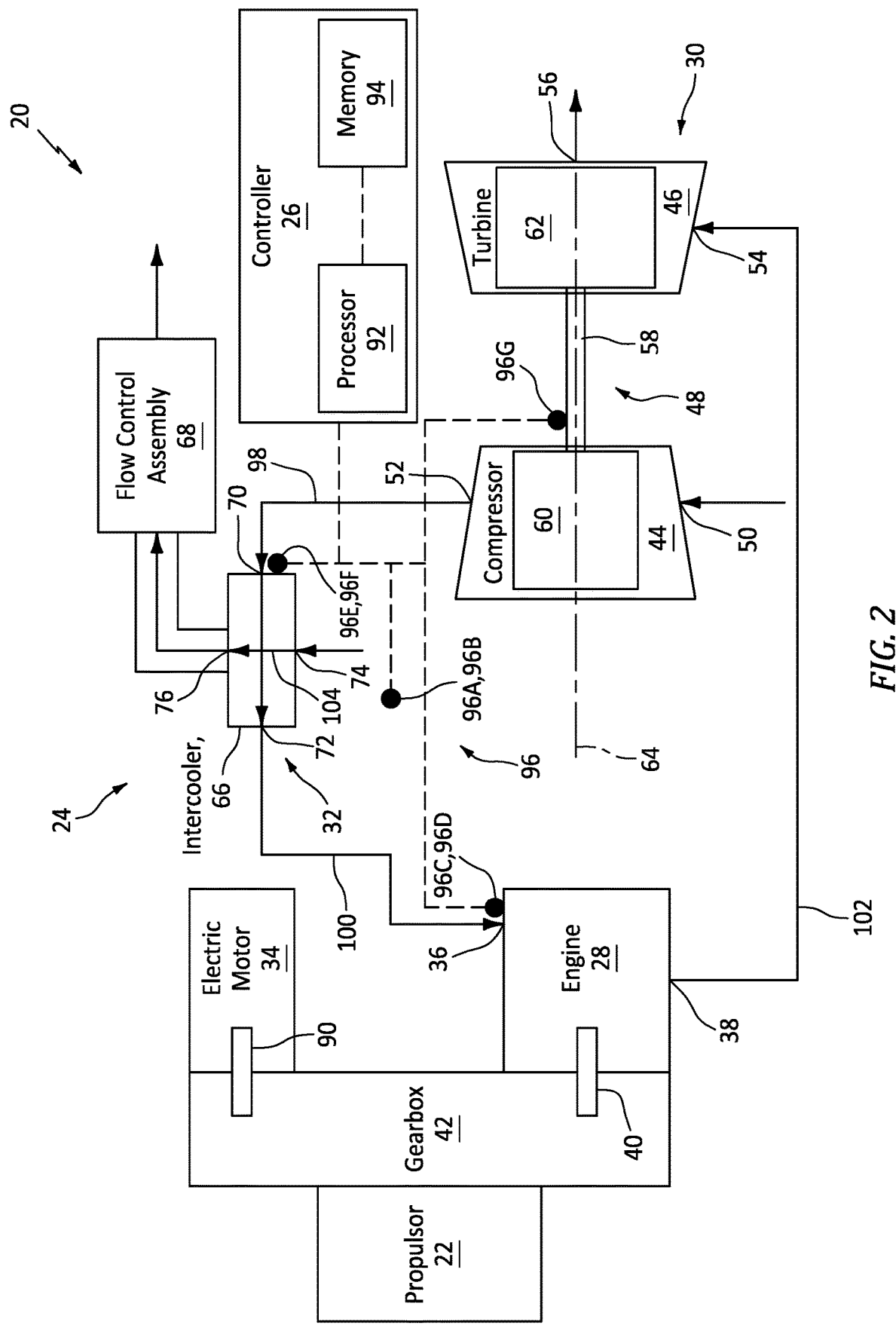
FIG. 2 schematically illustrates an engine assembly for an aircraft propulsion system, in accordance with one or more embodiments of the present disclosure.

FIG. 2 schematically illustrates the propulsion system 20. The propulsion system 20 of FIG. 2 includes an engine assembly 24 and a controller 26. The engine assembly 24 of FIG. 2 includes an engine 28, a turbine-compressor assembly 30, and an intercooler assembly 32. The engine assembly 24 may further include an electric motor 34.

The engine 28 of FIG. 2 is configured as an intermittent internal combustion engine. For example, the engine 28 may be a reciprocating engine such as, but not limited to, a piston engine or a rotary engine (e.g., a Wankel engine). The engine 28 includes an air inlet 36, an exhaust outlet 38, and an engine output shaft 40. The engine 28 receives compressed air from the turbine-compressor assembly 30 at the air inlet 36 and directs exhaust gas to the turbine-compressor assembly 30 from the exhaust outlet 38, as will be discussed in further detail. The engine 28 drives rotation of the engine output shaft 40. The engine output shaft 40 may be operably connected to (e.g., coupled with) the propulsor 22 by a gearbox 42 of the engine assembly 24 to drive, at least in part, rotation of the propulsor 22.

The turbine-compressor assembly 30 of FIG. 2 includes a compressor 44, a turbine 46, and a rotational assembly 48. The compressor 44 includes an air inlet 50 and an air outlet 52. The air inlet 50 is connected in fluid communication with an air intake of the propulsion system 20 to receive a flow of ambient air from outside the propulsion system 20. The air outlet 52 is connected in fluid communication with the air inlet 36 to direct compressed air from the compressor 44 to the air inlet 36. The turbine 46 includes an inlet 54 and an exhaust 56. The inlet 54 is connected in fluid communication with the exhaust outlet 38 to receive a flow of combustion exhaust gas from the engine 28. The turbine 46 exhausts the combustion exhaust gas from the propulsion system 20 at the exhaust 56. The rotational assembly 48 includes a shaft 58, a bladed compressor rotor 60 for the compressor 44, and a bladed turbine rotor 62 for the turbine 46. The shaft 58 interconnects the bladed compressor rotor 60 and the bladed turbine rotor 62. The shaft 58, the bladed compressor rotor 60, and the bladed turbine rotor 62 are arranged along and rotatable about an axial centerline 64 (e.g., a rotational axis) of the turbine-compressor assembly 30.

The intercooler assembly 32 includes an intercooler 66 and a flow control assembly 68. The intercooler 66 of FIG. 2 is configured as an air-to-air heat exchanger for cooling the compressed air from the air outlet 52 before the compressed air is received by the engine 28 at the air inlet 36. The intercooler 66 includes a primary air inlet 70 and a primary air outlet 72 for a hot side of the intercooler 66. The intercooler 66 further includes a secondary air inlet 74 and a secondary air outlet 76 for a cold side of the intercooler 66. The primary air inlet 70 is connected in fluid communication with the air outlet 52. The primary air outlet 72 is connected in fluid communication with the air inlet 36. The secondary air inlet 74 is connected in fluid communication with an air intake of the propulsion system 20 to receive a flow of ambient air from outside the propulsion system 20. The flow control assembly 68 is disposed at (e.g., on, adjacent, or proximate) the secondary air outlet 76.

Figure 3B:
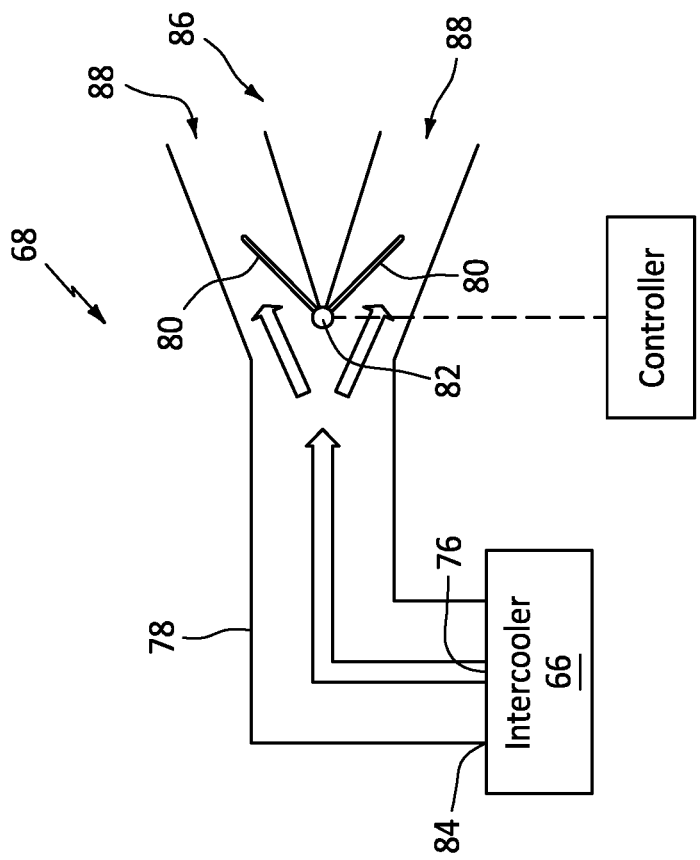
FIGS. 3A-B schematically illustrate flow control assembly configurations for an intercooler assembly, in accordance with one or more embodiments of the present disclosure.
Figure 3A:
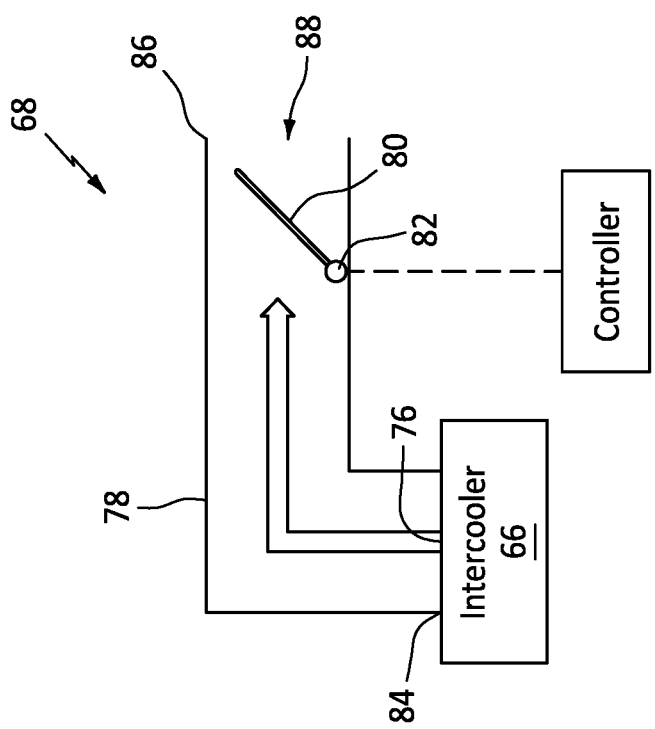

FIGS. 3A and 3B schematically illustrate configurations of the flow control assembly 68. The flow control assembly 68 includes an air outlet duct 78, at least one flap 80, and an actuator 82. The air outlet duct 78 may extend between and to a first end 84 of the air outlet duct 78 and a second end 86 of the air outlet duct 78. The first end 84 may be disposed at (e.g., on, adjacent, or proximate) the secondary air outlet 76. The air outlet duct 78 of FIG. 3A forms a single air outlet 88 at (e.g., on, adjacent, or proximate) the second end 86. The air outlet duct 78 of FIG. 3B is split between the first end 84 and the second end 86 to form two air outlets 88 at (e.g., on, adjacent, or proximate) the second end 86. The at least one flap 80 is positioned within the air outlet duct 78 between the first end 84 and the second end 86. The at least one flap 80 is positionable (e.g., pivotable) between a closed position and an open position. For example, the at least one flap 80 may be positioned in a closed position (e.g., a fully closed position), an open position (e.g., a fully open position), and a plurality of intermediate positions between the closed position and the open position to control a flow of air through the air outlet duct 78. The flow control assembly 68 of FIG. 3A includes a single flap 80 and the flow control assembly 68 of FIG. 3B includes two flaps 80 (e.g., one for each of the two air outlets 88). The actuator 82 is operably connected (e.g., mounted) to the at least one flap 80. The actuator 82 is configured to selectively position the at least one flap 80 in the closed position, the open position, or the plurality of intermediate positions. The actuator 82 is connected in communication (e.g., electrical or electronic communication) with the controller 26 to allow the controller 26 to control a position of the actuator 82. The actuator 82 may be configured, for example, as a direct current (DC)-motor driven electric actuator or any other suitable actuator configured for positioning (e.g., pivoting) the at least one flap 80. The at least one flap 80 may be positioned by a single actuator 82 or, alternatively, each of the flaps 80 may be positioned by a distinct actuator 82. The present disclosure, however, is not limited to the foregoing exemplary configurations of the flow control assembly 68.

Referring again to FIG. 2, the engine assembly 24 may include the electric motor 34, as previously discussed. The electric motor 34 includes a motor output shaft 90. The electric motor 34 is configured to drive rotation of the motor output shaft 90. The motor output shaft 90 may be operably connected to (e.g., coupled with) the propulsor 22 by the gearbox 42 to drive, at least in part, rotation of the propulsor 22. For example, the electric motor 34 may drive rotation of the propulsor 22 in combination with the engine 28. Alternatively, the electric motor 34 may drive rotation of the propulsor independently of the engine 28.

The controller 26 includes a processor 92 connected in signal communication with memory 94. The processor 92 may include any type of computing device, computational circuit, processor(s), CPU, computer, or the like capable of executing a series of instructions that are stored in the memory 94. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the engine assembly 24 and its components to accomplish the same algorithmically and/or by coordination of the engine assembly 24 components. The memory 94 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 26. The controller 26 may include, or may be in communication with, an input device that enables a user to enter data and/or instructions, and may include, or be in communication with, an output device configured, for example to display information (e.g., a visual display or a printer), or to transfer data, etc. Communications between the controller 26 and other electrical and/or electronic components (e.g., controllers, sensors, etc.) may be via a hardwire connection or via a wireless connection. A person of skill in the art will recognize that portions of the controller 26 may assume various forms (e.g., digital signal processor, analog device, etc.) capable of performing the functions described herein.

The controller 26 may form or otherwise be part of an electronic engine controller (EEC) for the engine assembly 24. For example, the EEC may control operating parameters of the engine assembly 24 such as, but not limited to, fuel flow, shaft (e.g., engine output shaft 40 and/or motor output shaft 90) torque and/or rotation speed, etc. so as to control an engine power or performance of the engine assembly 24. The EEC may modulate fuel flow to the engine 28 to obtain a desired output power of the engine assembly 24. In some embodiments, the EEC may be part of a full authority digital engine control (FADEC) system for the propulsion system 20.

The controller 26 may include or otherwise be connected in signal communication with one or more sensors 96 of the engine assembly 24 to measure operational parameters of the engine assembly 24. The sensors 96 of FIG. 2 include an ambient air temperature sensor 96A (e.g., an outside air temperature (OAT) sensor), an ambient air pressure sensor 96B (e.g., an outside air pressure (OAP) sensor), an engine air intake temperature sensor 96C, an engine air intake pressure sensor 96D, and a compressor rotation speed sensor 96G. The sensors 96 may further include an intercooler air inlet temperature sensor 96E and/or an intercooler air inlet pressure sensor 96F. The engine air intake temperature sensor 96C and the engine air intake pressure sensor 96D may be disposed at (e.g., on, adjacent, or proximate) the primary air outlet 72 or the air inlet 36 or otherwise between the primary air outlet 72 and the air inlet 36 to measure a temperature and a pressure of the cooled compressed air 100, respectively. The intercooler air inlet temperature sensor 96E and the intercooler air inlet pressure sensor 96F may be disposed at (e.g., on, adjacent, or proximate) the primary air inlet 70 or the air outlet 52 or otherwise between the primary air inlet 70 and the air outlet 52 to measure a temperature and a pressure of the hot compressed air 98, respectively.

During operation of the propulsion system 20 (e.g., for flight), ambient air outside the propulsion system 20 is directed into or otherwise received at the air inlet 50, compressed by the compressor 44 (e.g., the bladed compressor rotor 60), and directed to intercooler 66 through the air outlet 52. This hot compressed air 98 from the compressor 44 is directed to the primary air inlet 70. The hot compressed air 98 passes through the hot side of the intercooler 66 and is cooled within the intercooler 66 by transferring heat to the cold side of the intercooler 66 (e.g., ambient cooling air flowing through the cold side of the intercooler 66). This cooled compressed air 100 is directed from the primary air outlet 72 to the air inlet 36. The cooled compressed air 100 is mixed and burned with fuel in the engine 28 to drive operation of the engine 28 and rotation of the engine output shaft 40. The rotation of the engine output shaft 40 drives rotation of the propulsor 22 through the gearbox 42. Combustion exhaust gas 102 from the engine 28 is directed from the exhaust outlet 38 to the inlet 54. This combustion exhaust gas 102 flow through the turbine 46 drives rotation of the bladed turbine rotor 62 and, hence, the rotational assembly 48. The combustion exhaust gas 102 is then exhausted from the propulsion system 20 at the exhaust outlet 38. Ambient air 104 outside the propulsion system 20 is also directed into or otherwise received at the secondary air inlet 74 and directed through the cold side of the intercooler 66 to facilitate cooling of the hot compressed air 98, as discussed above. The ambient air 104 is directed out of the intercooler 66 at the secondary air outlet 76 and into the flow control assembly 68. The controller 26 controls the flow control assembly 68 (e.g., the actuator 82 to position the at least one flap 80) to control a flow rate of the ambient air 104 through the flow control assembly 68, thereby controlling cooling of the hot compressed air 98 within the intercooler 66. For example, the controller 26 may execute an engine air intake control loop to control a flow rate of the ambient air 104 through the flow control assembly 68 to control a temperature of the cooled compressed air 100 supplied to the engine 28 (e.g., using the engine air intake temperature sensor 96C).

In at least some conventional aircraft propulsion intercooler assemblies of which we are aware, the intercooler assemblies may include an actuator configured to control air flow through the intercooler assembly. These intercooler assemblies may additionally include an actuator position sensor (e.g., a rotary variable differential transformer (RVDT)) configured to measure a position of the actuator. This actuator position sensor may be used to perform an actuator stroke range check at the beginning of propulsion system engine operation (e.g., during an engine startup sequence) to verify that the intercooler can suitably control the temperature of air supplied to the engine air inlet. However, actuator position sensors, such as the actuator position sensor described above, can add considerable expense and complexity to aircraft propulsion systems. Moreover, these actuator position sensors may experience failure or loss of calibration, thereby negatively impacting propulsion system operation and performance.

Figure 4:
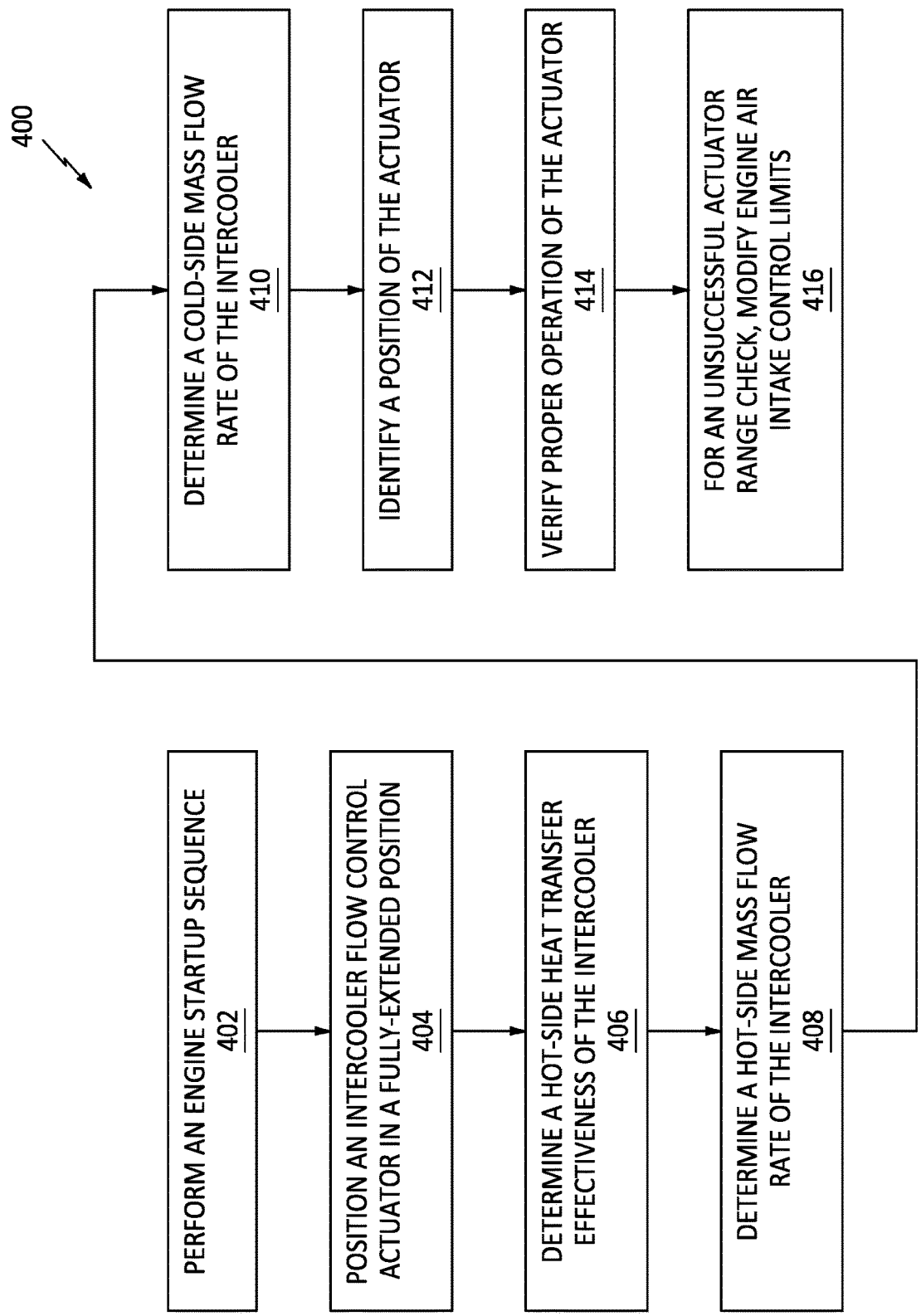
FIG. 4 illustrates a flowchart depicting a method for performing an actuator range check for a flow control assembly actuator, in accordance with one or more embodiments of the present disclosure.

Referring to FIGS. 2-4, a Method 400 for performing an actuator range check for a flow control assembly actuator is provided. For example, the Method 400 may be performed to verify proper operation of the actuator 82 to operate along the full range of motion of the actuator 82 (e.g., the actuator stroke) to verify that the intercooler 66 temperature controllability range (e.g., of the engine air intake temperature) can be maintained for operation of the engine assembly 24. The Method 400 may be performed to verify proper operation of the actuator 82 prior to execution of the engine air intake control loop with the controller 26. FIG. 4 illustrates a flowchart for the Method 400. The Method 400 will be described herein, for example, with respect to the engine assembly 24, the intercooler assembly 32, and the controller 26. The processor 92 may execute instructions stored in memory 94, thereby causing the controller 26 and/or its processor 92 to execute or otherwise control one or more steps of the Method 400. However, it should be understood that the Method 400 is not limited to use with the engine assembly 24, the intercooler assembly 32, or the controller 26 described herein. Unless otherwise noted herein, it should be understood that the steps of Method 400 are not required to be performed in the specific sequence in which they are discussed below and, in some embodiments, the steps of Method 400 may be performed separately or simultaneously.

Step 402 includes performing an engine startup sequence for the engine assembly 24. The controller 26 may control one or more components of the engine assembly 24 to execute the engine start sequence. The engine startup sequence for the engine assembly 24 may include operating the electric motor 34 (e.g., the motor output shaft 90) to start the engine 28 by driving the engine 28 (e.g., the engine output shaft 40) through the gearbox 42. This operation of the electric motor 34, which may be referred to as "dry motoring," may be performed prior to introducing fuel to the engine 28 to initiate combustion within the engine 28. The operation of the electric motor 34 to drive the engine 28 may further drive rotation of the rotational assembly 48 (e.g., with exhaust air from the engine 28), thereby causing the compressor 44 (e.g., the bladed compressor rotor 60) to supply the hot compressed air 98 to the intercooler 66, as described above. The electric motor 34 may drive (e.g., dry motor) the engine 28 and the rotational assembly 48 to establish initial operating conditions for performance of subsequent steps of the Method 400. For example, the electric motor 34 may operate to establish a rotation speed of the bladed compressor rotor 60 (e.g., measured by the compressor rotation speed sensor 96G) within a predetermined rotation speed range of the bladed compressor rotor 60 for performance of one or more of the following steps of the Method 400.

Step 404 includes positioning the actuator 82 in a fully-extended position. The fully-extended position of the actuator 82 may correspond to the open position (e.g., the fully open position) of the at least one flap 80. With the at least one flap 80 in the open position, the intercooler 66 facilitates maximum cold-side effective air flow through the flow control assembly 68 (e.g., the air outlet duct 78), and determines hot-side heat transfer effectiveness for a given compressor 44 operating point (e.g., bladed compressor rotor 60 rotation speed) and given ambient air conditions. For example, the controller 26 may control the actuator 82 to position in the fully-extended position. The controller 26 controls the position of the actuator 82 without position feedback. In other words, the actuator 82 does not include or otherwise interface with an actuator position sensor configured to provide an actuator 82 position signal to the controller 26.

Step 406 includes determining a hot-side heat transfer effectiveness of the intercooler 66. For example, the controller 26 may determine the hot-side heat transfer effectiveness of the intercooler 66 using the following equation [1]:

$$\varepsilon_h = \frac{T_{h\_in} - T_{h\_out}}{T_{h\_in} - T_{amb}}$$

where $T_{h\_in}$ is a temperature of the hot compressed air 98 flowing to the primary air inlet 70, $T_{h\_out}$ is a temperature of the cold compressed air 100 flowing to the air inlet 36 (e.g., engine air intake temperature), and $T_{amb}$ is a temperature of the ambient air (e.g., the outside air temperature (OAT). The $T_{h\_in}$ may be measured, for example, by the intercooler air inlet temperature sensor 96E. Alternatively, the $T_{h\_in}$ may be synthesized, for example, using a predetermined compressor performance map for the compressor 44 with measured values of compressor 44 (e.g., bladed compressor rotor 60) rotation speed, compressor 44 inlet temperature, and compressor inlet pressure. The $T_{h\_out}$ may be measured, for example, by the engine air intake temperature sensor 96C. The $T_{amb}$ may be measured, for example, by the ambient air temperature sensor 96A.

Step 408 includes determining a hot-side mass flow rate for air flow through the intercooler 66. For example, the controller 26 may determine a corrected mass flow rate of the air flow through the intercooler 66 hot side (e.g., from the primary air inlet 70 to the primary air outlet 72) by determining a differential pressure across the intercooler 66 hot side and a density of the air through the intercooler 66 hot side. The controller 26 may determine the corrected mass flow rate of the air flow through the intercooler 66 hot side, for example, using measurements provided by the engine air intake temperature sensor 96C, the engine air intake pressure sensor 96D, the intercooler air inlet temperature sensor 96E, and the intercooler air inlet pressure sensor 96F, or alternatively, synthesized values in place of one or more of the sensor measurements.

Figure 5:
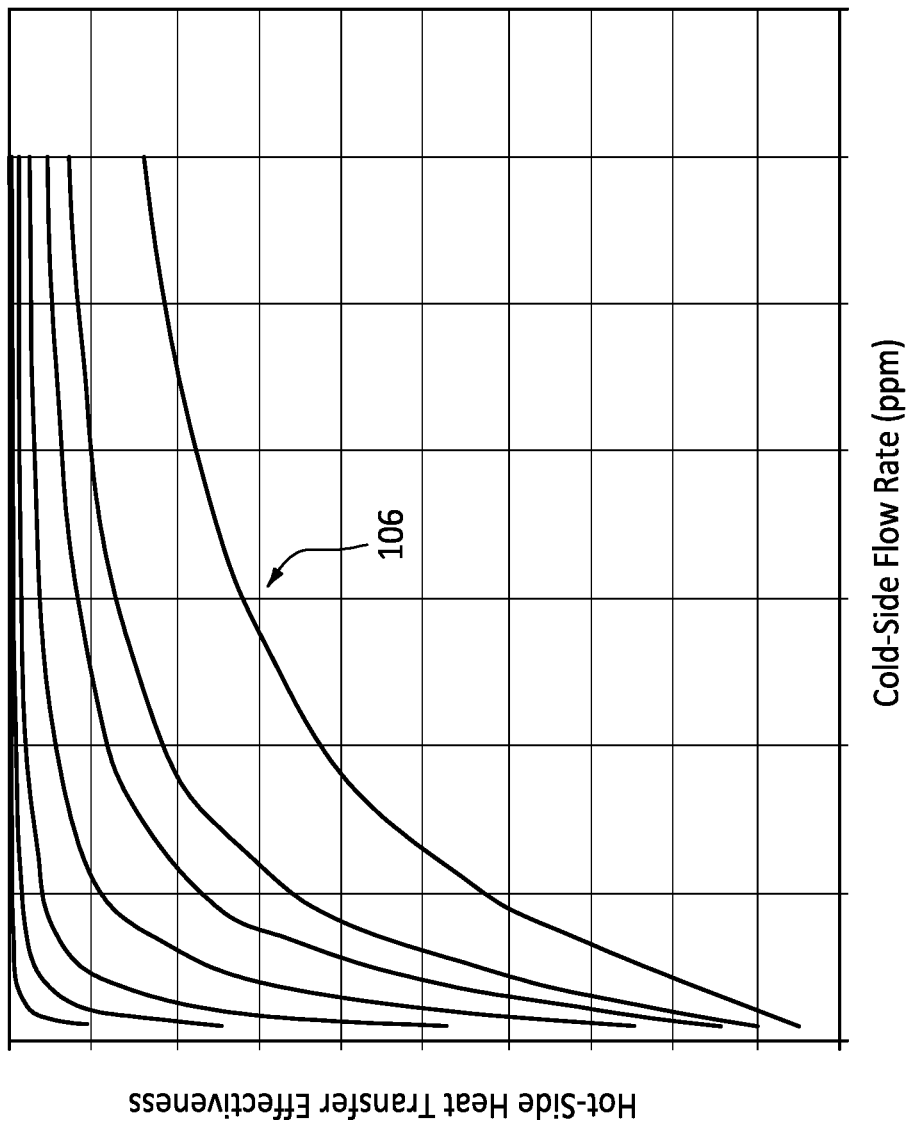
FIG. 5 illustrates a graph depicting intercooler hot-side heat transfer effectiveness and intercooler cold-side heat transfer effectiveness for a plurality of intercooler hot-side corrected mass flow rate values, in accordance with one or more embodiments of the present disclosure.

Step 410 includes determining a cold-side mass flow rate for air flow through the intercooler 66. For example, the controller 26 may determine a corrected mass flow rate of the air flow through the intercooler 66 cold side (e.g., from the secondary air inlet 74 to the secondary air outlet 76) using the determined hot-side heat transfer effectiveness (see Step 406) and the hot-side mass flow rate (see Step 408). FIG. 5 illustrates a graph depicting an exemplary relationship between the hot-side heat transfer effectiveness, the hot-side corrected mass flow rate, and the cold-side corrected mass flow rate for the intercooler 66. In particular, the graph of FIG. 5 illustrates a plurality of hot-side corrected mass flow rate curves 106 with each hot-side corrected mass flow rate curve 106 being a function of hot-side heat transfer effectiveness and cold-side corrected mass flow rate for the intercooler 66. As indicated in FIG. 5, the hot-side corrected mass flow rate and the cold-side corrected mass flow rate are expressed in pounds per minute (PPM), however, the present disclosure is not limited to any particular unit of measurement for mass flow rates. Using a predetermined relationship between the hot-side heat transfer effectiveness, the hot-side corrected mass flow rate, and the cold-side corrected mass flow rate for the intercooler 66, the controller 26 may determine the cold-side mass flow rate for air flow through the intercooler 66. A predetermined operational relationship between the hot-side heat transfer effectiveness, the hot-side corrected mass flow rate, and the cold-side corrected mass flow rate for an intercooler, such as the intercooler 66, may be determined, for example, through routine experimentation and/or analysis by a person of ordinary skill in the art for a given propulsion system, engine, and intercooler.

Step 412 includes identifying a position of the actuator 82. The controller 26 may identify a position of the at least one flap 80 and, hence, the actuator 82, using the determined cold-side mass flow rate for air flow through the intercooler 66 (see Step 410). The position of the at least one flap 80 may be determined by the controller 26 using a predetermined relationship between the at least one flap 80 position and the intercooler 66 cold-side mass flow rate for a given engine 28 operating point and given ambient air conditions such as, but not limited to, ambient air temperature and ambient air pressure. The ambient air conditions may be determined by the controller 26 using the ambient air temperature sensor 96A and/or the ambient air pressure sensor 96B. A predetermined operational relationship between the at least one flap 80 and the cold-side mass flow rate for air flow through the intercooler 66 may be determined, for example, through routine experimentation and/or analysis by a person of ordinary skill in the art for a given propulsion system, engine, and intercooler.

Step 414 includes verifying proper operation of the actuator 82 for the actuator range check. The controller 26 may compare the identified position of the actuator 82 (see Step 412) to an actuator position threshold range. For example, the controller 26 may identify a successful or unsuccessful actuator range check by comparing the identified position of the actuator 82 to the actuator position threshold range. For values of the actuator 82 position within the actuator position threshold range, the controller 26 may identify the actuator range check as successful. For values of the actuator 82 position outside of the actuator position threshold range, the controller 26 may identify the actuator range check as unsuccessful. The actuator position threshold range may be selected, for example, based on an acceptable fully-extended position of the actuator 82 and accounting for nominal sensor 96 error and actuator 82 positioning tolerances. The controller 26 may execute the engine air intake control loop to control engine 28 air intake temperatures after the controller 26 has identified the actuator range check as successful.

Step 416 may optionally include, for an identified unsuccessful actuator range check (see Step 414), modifying engine 28 air intake temperature limits to optimize control of the engine 28 air intake temperature by the flow control assembly 68 with a limited actuator 82 stroke range. For example, the controller 26 may identify reduced engine 28 air intake temperature limits. The reduced engine 28 air intake temperature limits may be based on a magnitude of the deviation of the actuator 82 position from the actuator position threshold range.

The present disclosure engine assembly 24 and method facilitate performance of an actuator range check for the actuator 82 of the flow control assembly 68 without the use of or need for an actuator position sensor, thereby facilitating improvements in propulsion system 20 cost, complexity, and operational reliability. Moreover, sensors (e.g., temperature and pressure sensors) used for the present disclosure actuator range check may also be used for execution of the engine air intake temperature control loop and, therefore, may already be installed and/or in use for a given aircraft propulsion system.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:
   an intercooler assembly including an intercooler and a flow control assembly,
      the intercooler includes a primary air inlet and a primary air outlet for a hot side of the intercooler, and the intercooler includes a secondary air inlet and a secondary air outlet for a cold side of the intercooler, and
      the flow control assembly is disposed at the secondary air outlet, the flow control assembly includes an actuator and at least one flap, the actuator is operably connected to the at least one flap to position the at least one flap in an open position, a closed position, and intermediate positions between the open position and the closed position to control an ambient air flow through the cold side; and a controller including a processor in communication with a non-transitory memory storing instructions, which instructions when executed by the processor, cause the processor to:
control the actuator to position the at least one flap in the open position;
determine a hot-side heat transfer effectiveness of the intercooler and a hot-side mass flow rate for the intercooler with the at least one flap in the open position;
determine a cold-side mass flow rate of the intercooler using the hot-side heat transfer effectiveness and the hot-side mass flow rate;
identify a position of the actuator using the cold-side mass flow rate; and
identify a successful or an unsuccessful actuator range check for the actuator by comparing the identified position of the actuator to an actuator position threshold range, and the successful actuator range check is identified where the identified position of the actuator is within the actuator position threshold range.

2. The assembly of claim 1, further comprising a compressor including a compressor air outlet, the compressor air outlet is connected in fluid communication with the primary air inlet, and a bladed compressor rotor for the compressor is configured to rotate to direct compressed air to the primary air inlet.

3. The assembly of claim 2, wherein the instructions, when executed by the processor, further cause the processor to control a rotation speed of the bladed compressor rotor by controlling the bladed compressor rotor to rotate at a predetermined rotation speed to determine the hot-side heat transfer effectiveness of the intercooler and the hot-side mass flow rate for the intercooler with the at least one flap in the open position.

4. The assembly of claim 2, further comprising an engine including an engine air inlet connected in fluid communication with the primary air outlet.

5. The assembly of claim 4, further comprising a rotational assembly including a bladed turbine rotor for a turbine, a shaft, and the bladed compressor rotor, and the shaft interconnects the bladed turbine rotor and the bladed compressor rotor.

6. The assembly of claim 5, wherein the engine further includes an engine air outlet connected in fluid communication with the turbine, and the engine is configured to direct a combustion exhaust gas from the engine air outlet to the turbine to drive rotation of the bladed turbine rotor.

7. An assembly for an aircraft propulsion system, the assembly comprising:
an engine including an engine air inlet;
a compressor including a compressor air outlet and a bladed compressor rotor, and the bladed compressor rotor is configured to rotate to direct compressed air to the engine air inlet;
an intercooler assembly including an intercooler and a flow control assembly,
the intercooler includes a primary air inlet and a primary air outlet for a hot side of the intercooler, the intercooler includes a secondary air inlet and a secondary air outlet for a cold side of the intercooler, the primary air outlet is connected in fluid communication with the engine air inlet and the primary air inlet is connected in fluid communication with the compressor air outlet such that the compressed air is directed from the compressor air outlet to the engine air inlet through the hot side of the intercooler, and
the flow control assembly is disposed at the secondary air outlet, the flow control assembly includes an actuator and at least one flap, the actuator is operably connected to the at least one flap to position the at least one flap in an open position, a closed position, and intermediate positions between the open position and the closed position to control an air flow through the cold side; and
a controller including a processor in communication with a non-transitory memory storing instructions, which instructions when executed by the processor, cause the processor to:
control the actuator to position the at least one flap in the open position;
determine a hot-side heat transfer effectiveness of the intercooler and a hot-side mass flow rate for the intercooler with the at least one flap in the open position;
determine a cold-side mass flow rate of the intercooler using the hot-side heat transfer effectiveness and the hot-side mass flow rate;
identify a position of the actuator using the cold-side mass flow rate; and
identify a successful or an unsuccessful actuator range check for the actuator by comparing the identified position of the actuator to an actuator position threshold range, and the successful actuator range check is identified where the identified position of the actuator is within the actuator position threshold range.

8. The assembly of claim 7, further comprising a gearbox and an electric motor, and the engine and the electric motor are operably connected together by the gearbox.

9. The assembly of claim 8, wherein the instructions, when executed by the controller, further cause the controller to control the electric motor to drive the engine through the gearbox while determining the hot-side heat transfer effectiveness of the intercooler and the hot-side mass flow rate for the intercooler with the at least one flap in the open position.

10. The assembly of claim 7, wherein the instructions, when executed by the processor, further cause the processor to execute an engine air inlet temperature control loop in response to identifying the successful actuator range check for the actuator.

11. The assembly of claim 7, wherein the instructions, when executed by the processor, further cause the processor to determine a reduced air temperature limit for the engine air inlet based on identifying the unsuccessful actuator range check for the actuator.

12. The assembly of claim 7, further comprising a plurality of sensors, the plurality of sensors includes a primary air outlet temperature sensor, a primary air outlet pressure sensor, and an ambient temperature sensor.

13. The assembly of claim 12, wherein the instructions, when executed by the processor, further cause the processor to determine the hot-side heat transfer effectiveness of the intercooler and the hot-side mass flow rate of the intercooler using one or more of the primary air outlet temperature sensor, the primary air outlet pressure sensor, or the ambient temperature sensor.

14. A method for performing an actuator range check for an actuator of a flow control assembly for an intercooler, the method comprising:
- controlling the actuator to position at least one flap of the flow control assembly in an open position;
- determining a hot-side heat transfer effectiveness of the intercooler and a hot-side mass flow rate for the intercooler with the at least one flap in the open position;
- determining a cold-side mass flow rate of the intercooler using the hot-side heat transfer effectiveness and the hot-side mass flow rate;
- identifying a position of the actuator using the cold-side mass flow rate; and
- identifying a successful or an unsuccessful actuator range check for the actuator by comparing the identified position of the actuator to an actuator position threshold range, and the successful actuator range check is identified where the identified position of the actuator is within the actuator position threshold range.

15. The method of claim 14, wherein with the at least one flap in the open position, the actuator is in a fully-extended position.

16. The method of claim 14, further comprising directing compressed air through a hot side of the intercooler with a compressor.

17. The method of claim 16, wherein the compressor includes a bladed compressor rotor, the method further comprising rotating the bladed compressor rotor at a predetermined rotation speed while determining the hot-side heat transfer effectiveness of the intercooler and the hot-side mass flow rate for the intercooler.

18. The method of claim 16, further comprising:
- directing the compressed air from the compressor, through the intercooler, and to an engine air inlet of an engine; and
- cooling the compressed air with the intercooler.

19. The method of claim 18, further comprising executing an engine air inlet temperature control loop, with a controller, in response to identifying the successful actuator range check for the actuator.

20. The method of claim 18, further comprising determining a reduced air temperature limit for the engine air inlet based on identifying the unsuccessful actuator range check for the actuator.

* * * * *